US012001555B1

(12) United States Patent
Edwards et al.

(10) Patent No.: US 12,001,555 B1
(45) Date of Patent: *Jun. 4, 2024

(54) SYSTEM, METHOD, AND APPARATUS FOR PREVENTING RANSOMWARE

(71) Applicant: WatchPoint Data, Inc., Cedar Rapids, IA (US)

(72) Inventors: Gregory Dale Edwards, Mount Vernon, IA (US); Christopher Neal Hartwig, Coral Springs, FL (US)

(73) Assignee: WatchPoint Data, Inc. dpa CryptoStopper, Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,431

(22) Filed: Jun. 8, 2023

Related U.S. Application Data

(63) Continuation of application No. 17/196,071, filed on Mar. 9, 2021, now Pat. No. 11,714,907.

(51) Int. Cl.
| | |
|---|---|
| *G06F 9/48* | (2006.01) |
| *G06F 21/52* | (2013.01) |
| *G06F 21/56* | (2013.01) |
| *G06N 20/00* | (2019.01) |

(52) U.S. Cl.
CPC ............ *G06F 21/566* (2013.01); *G06F 9/485* (2013.01); *G06F 21/52* (2013.01); *G06N 20/00* (2019.01); *G06F 2221/033* (2013.01)

(58) Field of Classification Search
CPC ........ G06F 21/566; G06F 9/485; G06F 21/52; G06F 2221/033; G06N 20/00
USPC ......................................................... 726/23
See application file for complete search history.

(56) References Cited

U.S. PATENT DOCUMENTS

| | | | | |
|---|---|---|---|---|
| 9,852,289 | B1 * | 12/2017 | Mann .................. | G06F 11/1451 |
| 10,122,752 | B1 * | 11/2018 | Soman ................ | H04L 63/0227 |
| 10,210,330 | B1 * | 2/2019 | Chen ................... | G06F 11/1451 |
| 10,375,576 | B1 * | 8/2019 | Wu ........................ | G06F 21/567 |
| 10,438,000 | B1 * | 10/2019 | Gu ......................... | G06F 21/554 |
| 10,469,525 | B2 * | 11/2019 | Hittel .................... | G06F 21/552 |
| 10,893,068 | B1 * | 1/2021 | Khalid .................. | G06F 21/554 |
| 11,170,104 | B1 * | 11/2021 | Stickle .................. | G06N 20/00 |
| 11,171,985 | B1 * | 11/2021 | Agrawal ............. | H04L 12/4641 |

(Continued)

OTHER PUBLICATIONS

Danny Yuxing Huang; Tracking Ransomware End-to-end; IEEE: year:2018; pp. 618-631.*

Primary Examiner — Monjur Rahim
(74) Attorney, Agent, or Firm — AdamsIP, LLC; Edward B. Garner, III; J. Hunter Adams

(57) ABSTRACT

A system and method for detecting and preventing ransomware includes creating a number of watch files in a filesystem, and adding a location and a timestamp of each to an ingest log. A number of native files are found in the filesystem and cataloged, adding the location and the timestamp of each to the ingest log. Periodically, each timestamp of each entry in the ingest log is compared to a current timestamp of a corresponding file in the filesystem and a count of watch files that have change and a count of native files that have changed is made. If the count of watch and native files that have changed indicate that a ransomware program is running on the computer, the ransomware program is suspended and reported. If a command indicates that the ransomware program is not ransomware, execution of the ransomware program is resumed.

16 Claims, 13 Drawing Sheets

(56) References Cited

U.S. PATENT DOCUMENTS

| | | | |
|---|---|---|---|
| 11,303,673 B1* | 4/2022 | Agrawal | H04L 61/5014 |
| 11,323,474 B1* | 5/2022 | Agrawal | H04L 63/1416 |
| 11,374,964 B1* | 6/2022 | Agrawal | H04L 63/20 |
| 2017/0140156 A1* | 5/2017 | Gu | G06F 11/1458 |
| 2017/0206353 A1* | 7/2017 | Jai | G06F 21/565 |
| 2017/0270293 A1* | 9/2017 | Gu | G06F 21/566 |
| 2017/0308711 A1* | 10/2017 | Barak | G06F 21/62 |
| 2018/0007069 A1* | 1/2018 | Hunt | H04L 63/1408 |
| 2018/0034835 A1* | 2/2018 | Iwanir | H04L 63/1416 |
| 2018/0048657 A1* | 2/2018 | Hittel | G06F 21/552 |
| 2018/0048658 A1* | 2/2018 | Hittel | G06F 21/565 |
| 2018/0075239 A1* | 3/2018 | Boutnaru | G06F 21/60 |
| 2018/0096150 A1* | 4/2018 | Viswanath | G06F 21/554 |
| 2018/0107824 A1* | 4/2018 | Gibbons, Jr. | G06F 21/565 |
| 2018/0157834 A1* | 6/2018 | Continella | G06F 21/568 |
| 2018/0248896 A1* | 8/2018 | Challita | G06F 21/554 |
| 2018/0288087 A1* | 10/2018 | Hittel | G06F 21/577 |
| 2018/0293379 A1* | 10/2018 | Dahan | G06F 21/568 |
| 2018/0324214 A1* | 11/2018 | Schoenherr | G06F 21/552 |
| 2019/0108341 A1* | 4/2019 | Bedhapudi | G06F 16/1752 |
| 2019/0109870 A1* | 4/2019 | Bedhapudi | H04L 63/0428 |
| 2019/0228147 A1* | 7/2019 | Formato | H04L 63/145 |
| 2019/0235973 A1* | 8/2019 | Brewer | G06F 11/1469 |
| 2019/0251259 A1* | 8/2019 | Stepanek | G06F 21/554 |
| 2019/0342330 A1* | 11/2019 | Wu | H04L 63/1441 |
| 2020/0042705 A1* | 2/2020 | Mager | G06F 21/554 |
| 2020/0067975 A1* | 2/2020 | Ojha | G06F 21/53 |
| 2020/0089876 A1* | 3/2020 | Aharoni | G06F 21/566 |
| 2020/0128027 A1* | 4/2020 | Hittel | G06F 21/552 |
| 2020/0128028 A1* | 4/2020 | Hittel | G06F 21/552 |
| 2021/0011807 A1* | 1/2021 | Rosenthal | G06F 11/1469 |
| 2021/0092147 A1* | 3/2021 | Hittel | G06F 21/577 |
| 2021/0173930 A1* | 6/2021 | Dahal | H04L 63/145 |
| 2021/0312049 A1* | 10/2021 | Thornton | G06F 21/567 |
| 2021/0319103 A1* | 10/2021 | Constantinescu | G06F 16/182 |
| 2021/0336968 A1* | 10/2021 | Bender | H04L 63/145 |
| 2021/0400057 A1* | 12/2021 | Devane | H04L 63/1425 |
| 2021/0409425 A1* | 12/2021 | Varshney | H04L 63/145 |
| 2022/0050896 A1* | 2/2022 | Ahmed | G06F 21/552 |
| 2022/0292194 A1* | 9/2022 | Edwards | G06F 9/485 |
| 2022/0398316 A1* | 12/2022 | Castrejon, III | G06F 21/552 |

* cited by examiner

Ingest Log

| Type | File Location | Accessed |
|---|---|---|
| watcher | C:..mywork111 | 9/4/2020 01:00:30 |
| native | C:/tmp/miscfile | 1/3/2017 05:21:30 |
| watcher | C:/tmp/mypic.jpg | 9/4/2020 01:00:30 |
| native | C:/users/admin/documents/important | 7/4/2018 09:21:00 |
| watcher | C:/users/adming/documents/a.exe | 9/4/2020 01:00:30 |
| native | C:/payroll/05-Jan | 1/5/2020 12:00:00 |

*FIG. 8*

SYSTEM, METHOD, AND APPARATUS FOR PREVENTING RANSOMWARE

FIELD

This invention relates to the field of computer security and more particularly to a system for detecting and thwarting ransomware.

BACKGROUND

Currently, many software systems attempt to provide a secure computing environment. Such systems are typically referred to as firewalls, anti-malware software, etc. Any computer (including cellular phones) that is connected to a network is subject to intrusion via that very network. In recent years, a new form of intrusion has cost people and companies huge amounts of money—ransomware. Ransomware is a term used to describe a virus, malware or breach that invades a computer or all computers on a network and encrypts one, many, or all files on the computer's filesystem (local files, remote files, cloud-based files, etc.). Once the files are encrypted, the computer(s) displays instructions as to how to send money to the ransomware maker, usually by a non-traceable payment service such as Bitcoin. In theory, after payment of the requested amount, a decryption key is provided to the person/company for decrypting all files back to their original form, though in some cases, no decryption key is provided and even after making payment, the person/company is left without their files.

Ransomware has hit many companies in recent years, including several government sites. When a city or township is looking at a total loss of all databases, including municipal violation records, property records, tax assessment records, etc., without a valid recourse, there is little left to do for that city or township other than pay the ransom, often hundreds of thousands of dollars.

Ransomware finds its way into computers by users that may be less careful than they should be. For example, when a user receives an email telling the user that they won an internet jackpot, and the user clicks on a link to collect their prize. Many users fall for this trick alone, though more sophisticated viruses often masquerade as someone who the user knows, sending an email with the ransomware attached and telling the user to open the attached file. Once the attachment is opened, the ransomware goes to work encrypting every file to which it can get access.

What is needed is a system that will detect the initiation of ransomware, stop the ransomware from encrypting files, and prevent future attacks by ransomware.

SUMMARY

In one embodiment, a system for detecting and preventing ransomware is disclosed including a computer protected by the system for detecting and preventing ransomware. The computer has a processor and a storage, the storage having a filesystem there within. Software running on the computer creates a number of watch files in the filesystem, for each watch file, an entry is added to an ingest log indicating at least a location of the watch file and a timestamp of the watch file. The software catalogs a number of native files from the filesystem, for each native file, an entry is added to the ingest log indicating at least the location of the native file and the timestamp of the native file. Periodically, the software compares each timestamp of each entry in the ingest log to a current timestamp in the filesystem of the watch file or the native file, determining a count of watch files that have changed and a count of native files that have changed, and the software determines if the count of watch files that have changed and the count of native files that have changed indicate that a program containing ransomware is running on the computer and if the program running on the computer contains ransomware, the software suspends the program and reports the ransomware. When the software receives a command indicating that the program does not contain ransomware, the software running on the computer resumes execution of the program.

In another embodiment, a method for detecting and preventing ransomware in a computer is disclosed, including creating a first number of watch files in a filesystem of the computer, for each watch file, adding an entry to an ingest log indicating at least a location of the watch file and a timestamp of the watch file and cataloging a second number of native files from the filesystem, for each native file, adding an entry to the ingest log indicating at least the location of the native file and the timestamp of the native file. Periodically, each timestamp of the entries in the ingest log are compared to a current timestamp in the filesystem of the watch file or the native file and a count of watch files that have changed and a count of native files that have changed is made. If the first count of watch files that have changed and the second count of native files that have changed indicate that a program that is running on the computer contains ransomware, suspending the program and reporting the ransomware. After receiving a command indicating that the program does not contain ransomware, resuming execution of the program.

In another embodiment, program instructions tangibly embodied in a non-transitory storage medium of a computer for protecting from ransomware are disclosed. The at least one instruction includes computer readable instructions running on the computer creating a first number of watch files in a filesystem of the computer, for each watch file, adding an entry to an ingest log indicating at least a location of the each watch file and a timestamp of the each watch file and the computer readable instructions running on the computer cataloging a second number of native files from the filesystem, for each native file, adding the entry to the ingest log indicating at least the location of the each native file and the timestamp of the each native file. Periodically, the computer readable instructions running on the computer comparing each timestamp of each entry in the ingest log to a current timestamp in the filesystem of the each watch file or the each native file and determining a first count of watch files that have changed and a second count of native files that have changed and the computer readable instructions running on the computer determining if the first count of watch files that have changed and the second count of native files that have changed indicate that a program that is running on the computer contains ransomware, the computer readable instructions running on the computer learning from historical changes and rules and tuning determination, and, thereby the computer readable instructions running on the computer compensating for normal use of the computer. When the determining by the computer readable instructions running on the computer indicates that the program that is running on the computer contains ransomware, the computer readable instructions running on the computer suspend the program and report the ransomware and when receiving a command indicating that the program does not contain ransomware by the computer readable instructions running on the computer, the computer readable instructions running on the computer resuming execution of the identified program.

In some embodiments, the ingest log includes a hash value and/or at least partial content of the watch files and/or native files and periodically, the current hash value or current content of such watch files and/or native files are compared that stored in the ingest file to determine if the watch files and/or native files have been modified.

BRIEF DESCRIPTION OF THE DRAWINGS

The invention can be best understood by those having ordinary skill in the art by reference to the following detailed description when considered in conjunction with the accompanying drawings in which:

FIG. 8 illustrates a sample tracking file, or ingest log, used by the system for detecting and preventing ransomware.

DETAILED DESCRIPTION

Figure 1:
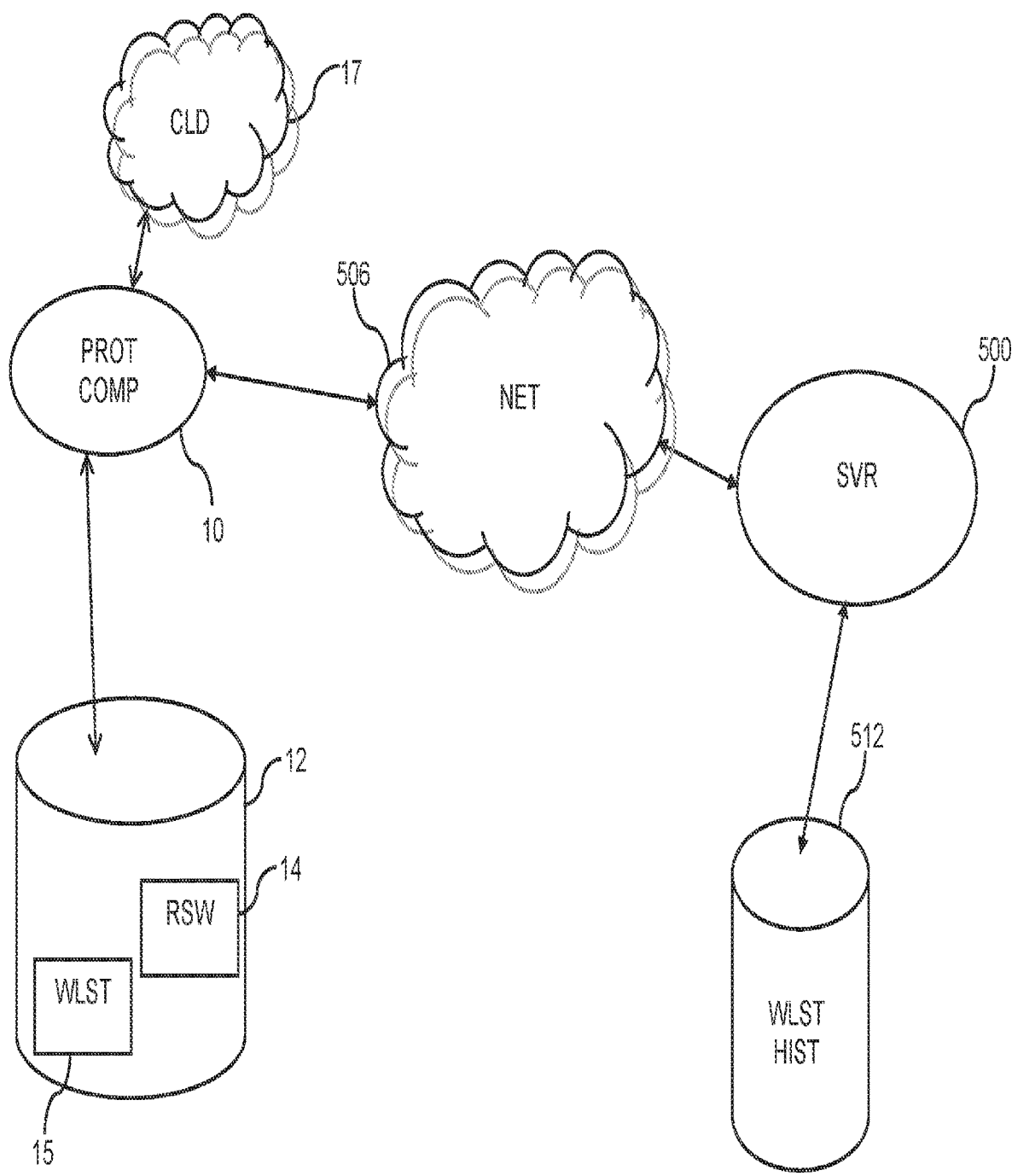
FIG. 1 illustrates a data connection diagram of the system for detecting and preventing ransomware.

Reference will now be made in detail to the presently preferred embodiments of the invention, examples of which are illustrated in the accompanying drawings. Throughout the following detailed description, the same reference numerals refer to the same elements in all figures.

In general, the system for detecting and preventing ransomware provides an enhanced level of protection from such malicious software by monitoring a protected computer and detecting any program that acts like ransomware. As there are many programs that are available for legitimate encryption of one or more files, the system for detecting and preventing ransomware provides for bypassing the protection provided, either through a user response, enhanced determination that the program is legitimate, and/or listing known valid programs and/or ransomware programs.

In general, a whitelist provides an automated way to allow the execution of software that is known to be legitimate and a blacklist provides an automated way to block execution of programs containing code that is contaminated (e.g., contains or is ransomware software). In some embodiments, before execution of any code on the protected computer system, a test is performed by checking one or more whitelists and/or blacklists to determine if the program has been approved for execution on the protected computer system (e.g., on the whitelist) and if so, allowing execution of the code. If the program is disapproved (e.g., on the blacklist), the system for detecting and preventing ransomware blocks execution. If the program is not on neither the whitelist nor the blacklist, the system for detecting and preventing ransomware must determine if the program contains ransomware based upon analysis of the program's actions.

Throughout this description, the term, "protected computer" refers to any system that has a processor, runs software, and is vulnerable to ransomware. Examples of such are: a personal computer, a server computer, a notebook computer, a tablet computer, a smartphone, a smart watch, a smart television, etc. The term, "user" refers to a human that has an interest in the protected computer, perhaps a user who is using the protected computer or an administrator.

Throughout this description, the term "directory" or "directory path" describes a hierarchical pathway to a particular folder in which files (e.g., data or programs) are stored. For example, "C:/windows/system32" refers to files stored in a folder called "system32" which is a subfolder of another folder called "windows" which is a top-level folder of a storage device known as "C:." Note that the storage device (e.g., C:) is at times a physical device (e.g., a separate disk drive) or a logical device (e.g., a portion of a disk drive). Also note that the described representation (e.g., "C:/windows/system32") is a human-readable representation of such hierarchy used by certain operating systems and any such representation is anticipated and included herein (e.g., some representations use backslashes instead of slashes).

Throughout this description, the term, "ransomware" refers to any software or script having the intent of encrypting at least one file on the target system and then requesting a ransom payment in exchange for the key needed to decrypt the at least one file.

In general, the user of the system, method, and apparatus being described determine if a program (e.g., an executable, macro, form, script, etc.) is ransomware or likely to be ransomware and when the program is determined to be or likely to be ransomware, the program is blocked until a user (e.g., a user of the protected computer or administrator) agrees that the program is legitimate or agrees that the program is likely ransomware. As with other virus scanners, it is anticipated that, in some embodiments, the system for detecting and preventing ransomware characterizes the questionable program using the program file name, hash value, signatures; finding of key sequences typically indicates that the program matches a known ransomware program, etc. Unfortunately, this is not sufficient, as ransomware is a lucrative, and illegal business with a lot to be gained by infecting protected computers.

Referring to FIG. 1 illustrates a data connection diagram of the system for detecting and preventing ransomware. In this example, a protected computer 10 (e.g., a personal computer that is being protected) communicates through a network 506 (e.g., the Internet, local area network, etc.) to a server computer 500.

The server computer 500 has access to data storage 512. In some embodiments, the data storage 512 has therewithin a whitelist and history files; for example, a whitelist of programs/applications that are known to be of low risk of having malware that includes ransomware. In some embodiments, the data storage 512 is in the cloud. Although one path between the protected computer 10 and the server computer 500 is shown going through the network 506 as shown, any known data path is anticipated. For example, the Wi-Fi transceiver 96 (see FIG. 2) of the protected computer 10 is used to communicate with the wide area network 506, which includes the Internet, and, consequently, with the server computer 500.

The server computer 500 transacts with system for detecting and preventing ransomware that runs on the protected computer 10 through the network(s) 506. The system for detecting and preventing ransomware runs on the protected computer 10 and monitors any activation of programs/applications/scripts (e.g., running of a program) and monitors various activities of programs that are running on the protected computer 10. If a program/application/script is deemed malware-free (e.g., is in the whitelist 15), it is usually allowed to run. Information is also transferred from system for detecting and preventing ransomware that runs on the protected computer 10 to the server computer 500 regarding potential threats, whitelist updates, etc. Note that in some embodiments, there are no whitelists, as this is an optional feature.

The server computer 500 transacts with the system for detecting and preventing ransomware that runs on the protected computer 10 as needed, for example, to update the whitelists 15 stored on the protected computer 10.

The system for detecting and preventing ransomware that runs on the protected computer 10 selectively provides execution approval to software that attempts to execute on the protected computer 10. In such, if approval is provided, the software is able to execute on the protected computer 10. If approval is not provided, the software is blocked from executing on the protected computer 10 and various additional steps are taken such as logging the attempt, transferring the suspect software to the server computer 500 for analysis, informing the user of the protected computer 10, etc. In some embodiments, a whitelist 15 is accessed by the system for detecting and preventing ransomware; the whitelist contains identifiers (e.g., names, hash values, program sizes, certificate information) of known programs. For example, if the protected computer tries to run word.exe and word.exe is found in the whitelist 15 (e.g., a program named word.exe with the correct size and/or hash value), then the system for detecting and preventing ransomware allows word.exe to execute. In some embodiments there is also a blacklist containing identifiers of known ransomware programs.

In FIG. 1, a ransomware program 14 is stored in the storage 12. In this benign state, the ransomware program 14 is not running and is not actively encrypting files. Note that such ransomware programs 14 are often inadvertently saved in the storage 12 of the protected computer 10, for example, copied from an email, installed when accessing a web site, etc., waiting for an unsuspecting user to activate the ransomware stored within. Note that some protected computers 10 utilize remote storage such as cloud storage 17, network-attached storage, an attached device (e.g., USB drive, attached smartphone) or remote storage such as that associated with a server 500. Ransomware is known to find such storage and encrypt files that are not local to the protected computer 10 as well as files that are local to the protected computer 10.

Figure 2:
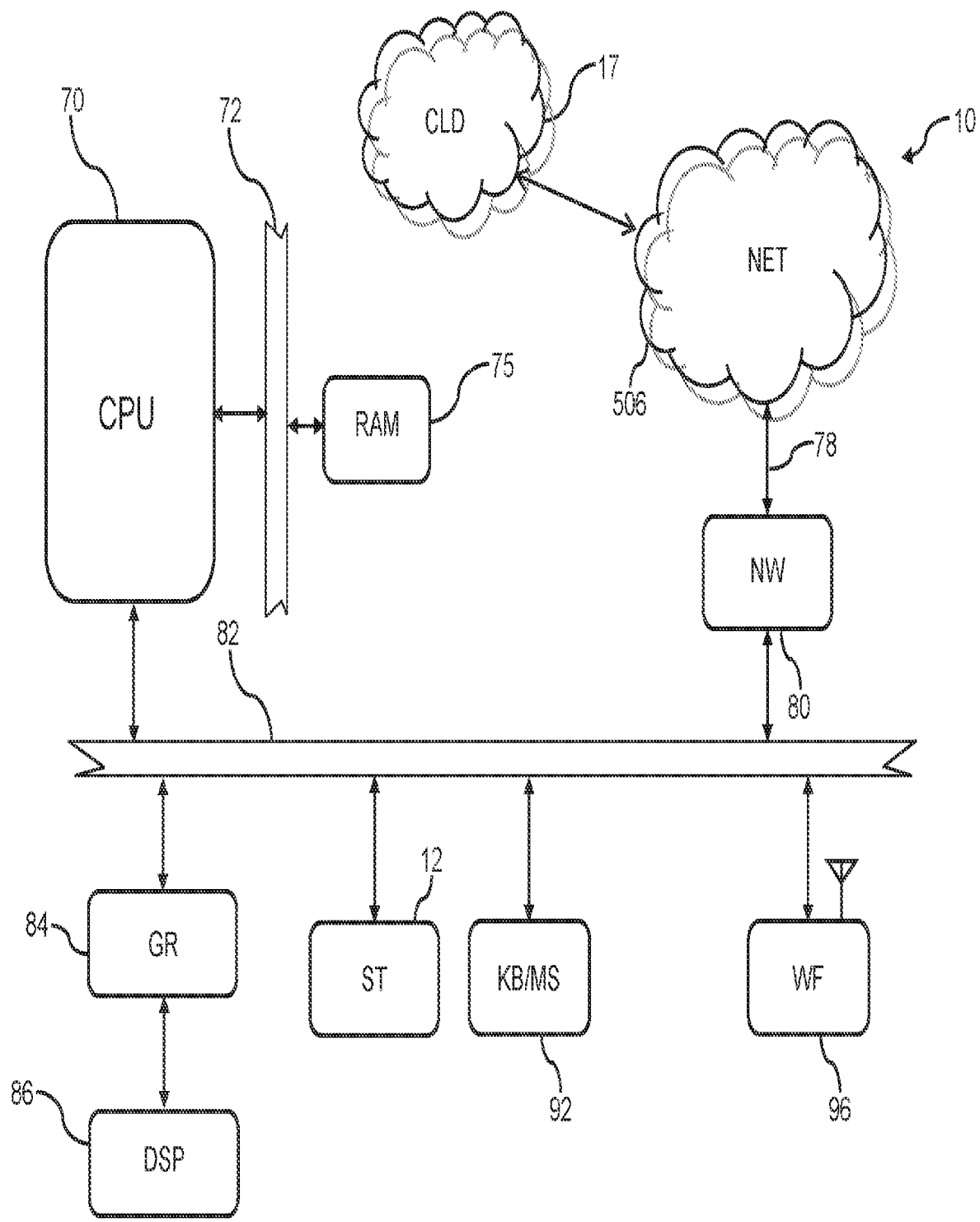
FIG. 2 illustrates a schematic view of a typical computer protected by the system for detecting and preventing ransomware.

Referring to FIG. 2, a schematic view of a typical protected computer 10 is shown. The system for detecting and preventing ransomware running on the protected computer 10 executes on any processor-based device (e.g., protected computer 10) for providing protection against programs/applications/scripts that contain malicious software (ransomware). The present invention is in no way limited to any particular computer. Protection for many other processor-based devices is equally anticipated including, but not limited to smart phones, cellular phones, portable digital assistants, routers, thermostats, fitness devices, smart watches etc.

The example protected computer 10 represents a typical device that is protected by the system for detecting and preventing ransomware that runs on the protected computer 10. This exemplary protected computer 10 is shown in its simplest form. Different architectures are known that accomplish similar results in a similar fashion, and the present invention is not limited in any way to any particular computer system architecture or implementation. In this exemplary protected computer 10, a processor 70 executes or runs programs in a random-access memory 75. The programs are generally stored within a persistent memory, storage 12, and loaded into the random-access memory 75 when needed. The processor 70 is any processor, typically a processor designed for phones. The random-access memory 75 is interfaced to the processor by, for example, a memory bus 72. The random-access memory 75 is any memory suitable for connection and operation with the selected processor 70, such as SRAM, DRAM, SDRAM, RDRAM, DDR, DDR-2, etc. The storage 12 is any type, configuration, capacity of memory suitable for persistently storing programs and data, for example, flash memory, read only memory, battery-backed memory, hard disks, etc. In some exemplary protected computers 10, the storage 12 is removable, in the form of a memory card of appropriate format such as SD (secure digital) cards, micro-SD cards, compact flash, etc.

Also connected to the processor 70 is a system bus 82 for connecting to peripheral subsystems such as a cellular network interface 80, a graphics adapter 84 and input/output devices 92 such as mice, keyboards, etc. The graphics adapter 84 receives commands from the processor 70 and controls what is depicted on the display 86. The input/output devices 91 provides navigation and selection features.

In general, some portion of the storage 12 is used to store programs, executable code, and data, etc. In some embodiments, other data is stored in the storage 12 such as audio files, video files, text messages, etc.

The peripherals shown are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments, a network interface 80 connects the protected computer 10 to the network 506 through any known or future protocol such as Ethernet, Wi-Fi, GSM, TDMA, LTE, etc., through a wired or wireless medium 78. There is no limitation on the type of connection used. In such, the network interface 80 provides data and messaging connections through the network 506, connecting the protected computer 10 to other computer systems such as the Internet and the server computer 500. In some embodiments, remote storage is accessible through the network 506, for example, cloud storage 17.

Figure 3:
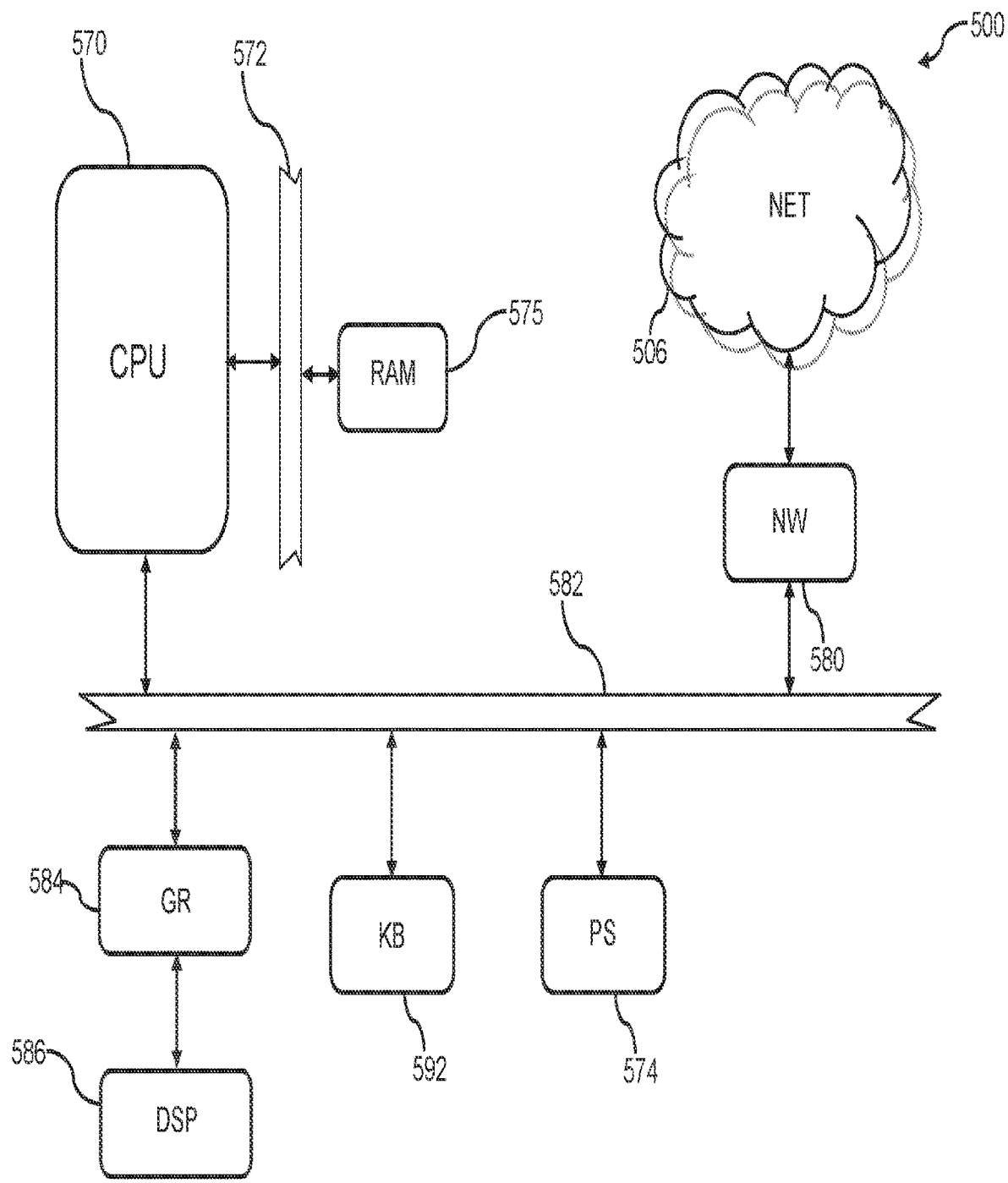
FIG. 3 illustrates a schematic view of a typical server computer system.

Referring to FIG. 3, a schematic view of a typical server computer system (e.g., server computer 500) is shown. The example server computer 500 represents a typical server computer system used for back-end processing, generating reports, displaying data, etc. This exemplary server computer 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, and data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

As the protected computer 10 is connected to the data network 506, there is the possibility that malware enters the protected computer 10 by various means, for example, by as an email message, by browsing a malicious web page, by a trojan horse program transferred into the protected computer 10, perhaps when other system security settings are not properly set, etc.

In some malware, the execution of the ransomware is delayed, possibly when the user of the protected computer 10 is away from the protected computer 10.

The general operation of ransomware includes visiting all/some/most nodes of a filesystem (e.g., every file folder) that are accessible by the target computer and encrypting every file found in each node using a certain encryption key. This includes local storage (e.g., hard disk, local flash, attached storage via USB . . . ) as well as remote storage (e.g., network-attached storage, cloud storage 17 . . . ). As the encryption key and encryption algorithm is very secure, once each file is encrypted, it is almost impossible to decrypt the files without knowing the decryption key. After the ransomware is finished encrypting all of the files, a message is displayed on a display device 86 (see FIG. 5) providing a warning that all files have been encrypted and in order to retrieve the decryption key, the user must invoke a method of sending payment to the attackers. Even with payment of the ransom, some attackers fail to provide the decryption key. If the ransom is not paid or the attacker fails to provide the decryption key and unless some sort of non-connected back-up has been performed, all data at the protected computer 10 that was targeted by the ransomware is lost.

The system for detecting and preventing ransomware provides protection by first, and optionally, preventing the initiation of a program that contains ransomware. This is done through any known technique such as whitelists 15, blacklists, looking for certain patterns in the program, checking the program for a correct hash value, etc. Unfortunately, although such checking may prevent invasion by some ransomware, as ransomware evolves, new versions of ransomware become prevalent and might not be detected by these checks.

The system for detecting and preventing ransomware provides enhanced protection by deploying and cataloging randomly generated canary files called watch files. For example, for one file system, twenty-five watch files are deployed at the folder root and in various folders that are two levels deep. Watch file deployment is optimized based on the number of folders and number of files accessible by the protected computer and other computers connected in an enterprise. Note that the folders and files accessible by the protected computer 10 include local folders and files (e.g., folders and files stored in local storage 12 such as local drives, USB drives . . . ) as well as remote folders and files (e.g., folders and files stored in network-attached storage, cloud storage 17, server-based storage . . . ). The watch files are randomly generated with commonly used file extensions and, in some embodiments, having small file sizes (e.g., less than 70 KB). The attributes of some or all of the watch files are set to hidden. Further, in some embodiments, native files are recruited and cataloged to be watched. For example, a minimum of twenty-five native files per folder are recruited, this number optimized based on number of files and folders in the system. Each native file is cataloged. In some embodiments, administrative options are provided to set which files systems are monitored, the number of watch files, and the number of native files that are recruited.

If a ransomware program 14 is run and the ransomware program 14 is deemed not to be ransomware by the above means, the ransomware program 14 begins the process of encrypting files. Left unattended, the ransomware program 14 will eventually attempt to encrypt one of the watch files or several of the cataloged native files. The system for detecting and preventing ransomware has an index to all of the watch files and native files, continuously monitoring for any change made to any of the watch and native files. If any change is made to any of the watch and/or several native files, the system for detecting and preventing ransomware stops execution of the offending program and reports the situation as there is no reason for a user to modify any watch file, especially the watch files that are hidden. If a preset number of native files (e.g., three) are changed, for example, in a given period of time (e.g., one second), the system for detecting and preventing ransomware stops execution of the offending program and reports the situation as the reason for the changes to the preset number of native files is unknown and is possibly due to ransomware. If the user of the protected computer has knowingly started a program that might act like ransomware (e.g., running a program that changes multiple files), the user responds to the report indicating that the program is known and the system for detecting and preventing ransomware allows the program to continue.

Figure 4:
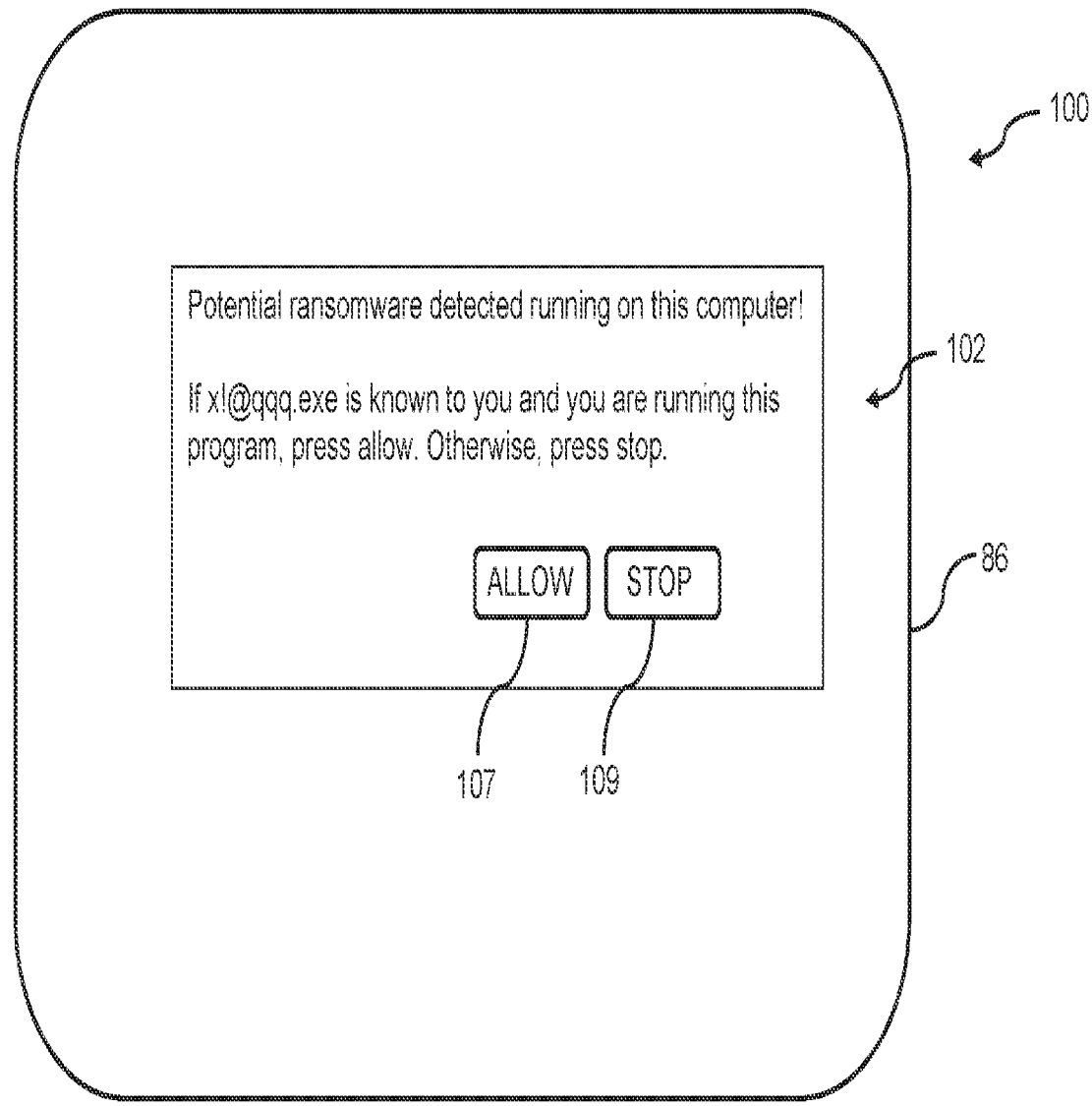
FIG. 4 illustrates a computer user interface of the system for detecting and preventing ransomware.

Referring to FIG. 4, a typical user interface 100 of the system for detecting and preventing ransomware is shown. In this, the system for detecting and preventing ransomware has detected a program called "x!@qqq.exe" that is running and behaving like ransomware (e.g., modifying or encrypting multiple files or modifying one of the watch files). The program is temporarily stopped and a warning message 102 is displayed.

If the program called "x!@qqq.exe" is known to the user/operator of the protected computer 10, then the user/ operator of the protected computer 10 need only select the allow option 107 and operation of the program will continue.

If the program called "x!@qqq.exe" is not known to the user/operator of the protected computer 10, the user/operator of the protected computer 10 selects the stop option 109. As such a computer is often very dangerous, in some embodiments, upon detection and before emitting a warning, the protected computer 10 is temporarily isolated from other network access, such as network attached storage, cloud storage, remote storage, other internal/detachable storage, etc., as a protection from damage to such by the ransomware. Note that in some embodiments, after the user/operator selects the stop option 109, this isolation is maintained until the user and/or information technology personnel cleans the protected computer 10 of the ransomware and restores any damaged files. Note that, in some embodiments, if, after the warning message 102 is displayed, no response is received from the user/operator, the protected computer 10 is isolated from other network access, such as network attached storage, cloud storage, remote storage, other internal/detachable storage, etc., as a protection from damage to such by the ransomware.

As the user/operator runs various programs that trigger the system for detecting and preventing ransomware (e.g., programs that behave like ransomware), the user/operator will find it obstructive to workflow to constantly receive the message as in FIG. 4. In general, the usefulness of many virus prevention programs often relates to the burden placed on users and administrators, in that, if the burden is low or invisible, the virus prevention programs will be followed and allowed to operate freely, but when the burden gets too high, the user or administrator will become frustrated at the added burden of the virus prevention program and either disable the virus protection program or hamper the effectiveness of the virus prevention program. Therefore, it is desired to hone the system for detecting and preventing ransomware to the type of applications that normally run on the protected system. For example, many office computers run office programs such as word processors, tax software, spreadsheet programs, presentation programs, etc. These programs usually make changes to one or two files at a time. Therefore, on such office computers, if three files are changed within a short interval of time, it is suspicious that a ransomware program is running. As another example, computers used to develop software or for scientific research have several programs that often modify many programs in a short interval of time. In such, it is more difficult to detect whether a given program is ransomware or a legitimate program being run by a user of that computer.

As will be described, the system for detecting and preventing ransomware uses various tools to determine the overall file access scenario for a target computer, then tunes the ransomware detection algorithms to balance between over-reporting and missing a ransomware program before significant damage is done.

In some embodiments, the system for detecting and preventing ransomware monitors the cryptographic service (e.g., cryptsp.dll), stops any process not in the whitelist and issues a notification.

In some embodiments, the system for detecting and preventing ransomware monitors for file extension changes of known ransomware variants, stops the process creating those extension changes and issues a notification.

In some embodiments, the system for detecting and preventing ransomware monitors files being written to memory, stops processes that are actively encrypting files in memory before the files are written to disk and issues a notification.

In some embodiments, the system for detecting and preventing ransomware monitors Antivirus and Intrusion Prevention services to detect forced shutdowns, stopping the service causing the shutdown and issuing a notification.

In some embodiments, the system for detecting and preventing ransomware monitors registry and processes for ransomware behavior, stops associated process and issues a notification.

Referring back to FIG. 4, after the allow option 107 is selected, local files are updated to indicate that this program is known to the user/operator (e.g., added to a whitelist). Likewise, after the stop option 109 is selected, local files are updated to indicate that this program is not known (e.g., added to a blacklist) and is likely ransomware. Further, in some embodiments, a copy of the program and name other information available about the program (e.g., names/locations of files modified) is sent to the server 500 for further analysis.

Figure 5:
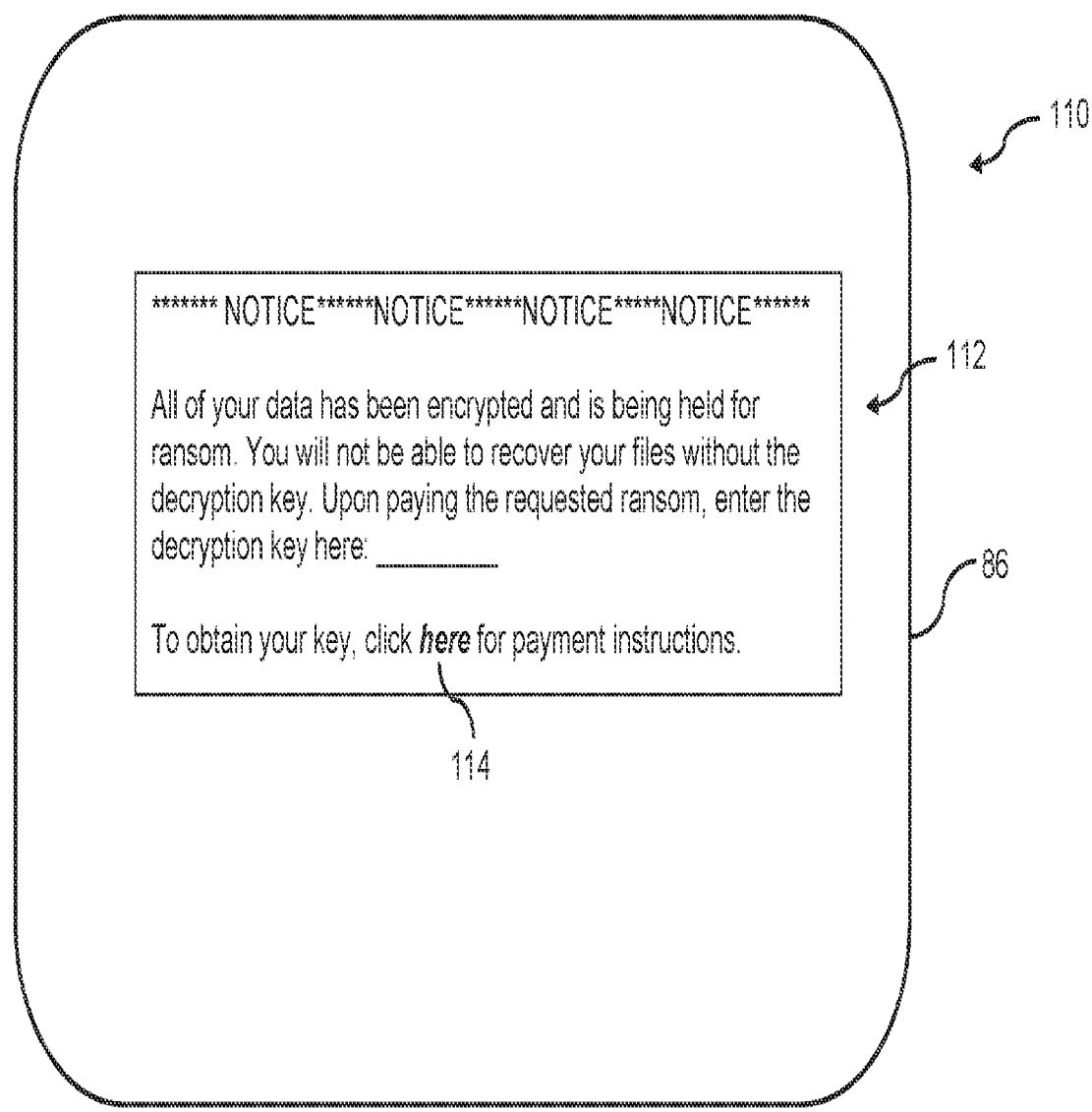
FIG. 5 illustrates a troubling computer-generated user interface of the prior art.

Referring to FIG. 5, a troubling user interface 110 of the prior art is shown. In this troubling user interface 110, the ransomware program has already encrypted the user's files and is requesting a ransom before the decryption key will be provided. The user is able to find out how to pay the ransom by clicking on the link 114 provided. Ransom payment is typically requested by payment means that are not traceable, for example, payment by Bitcoin. Hopefully, after payment is made and verified, the decryption key will be provided by the criminal organization and, upon entry of the correct decryption key, the user's files will be restored to a usable state. It is better to prevent the ransomware from entering a user's system, but if that fails and ransomware is able to get into the user's system, the next best result other than preventing entry is early detection and stopping of the encryption process of the ransomware. The system for detecting and preventing ransomware uses heuristics and artificial intelligence to detect the execution and operation of ransomware, stopping and isolating the program that is performing the encryption and reporting the issue to the user/administrator.

Figure 6:
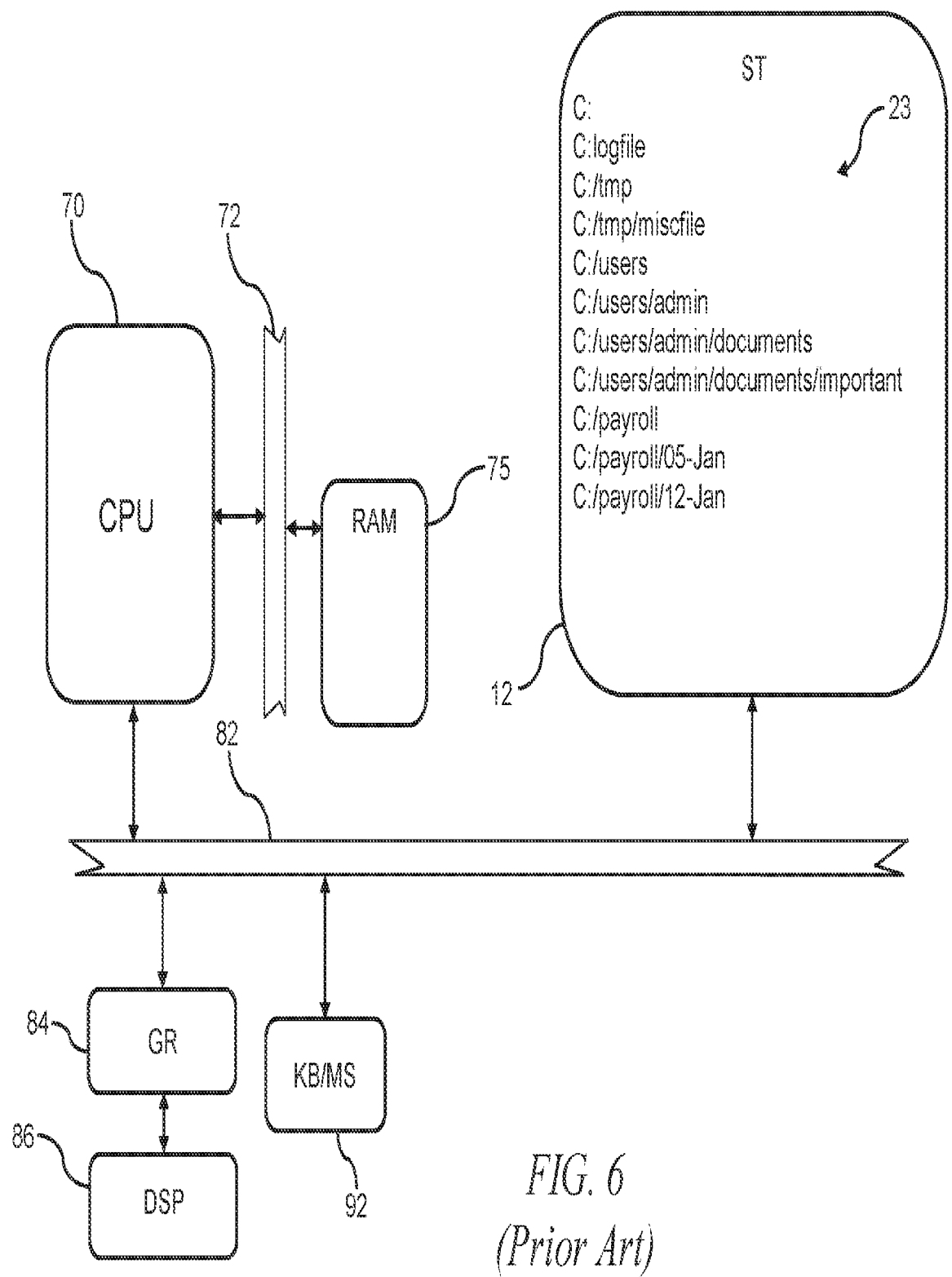
FIG. 6 illustrates the exemplary computer of the prior art, showing a file system in storage.

Referring to FIG. 6, a simplified example of a protected computer 10 and storage 12 as per the prior art is shown. In FIG. 6, a filesystem 23 is shown as a short, exemplary list of folders and files is in the storage 12 prior to installation of the system for detecting and preventing ransomware.

Figure 7:
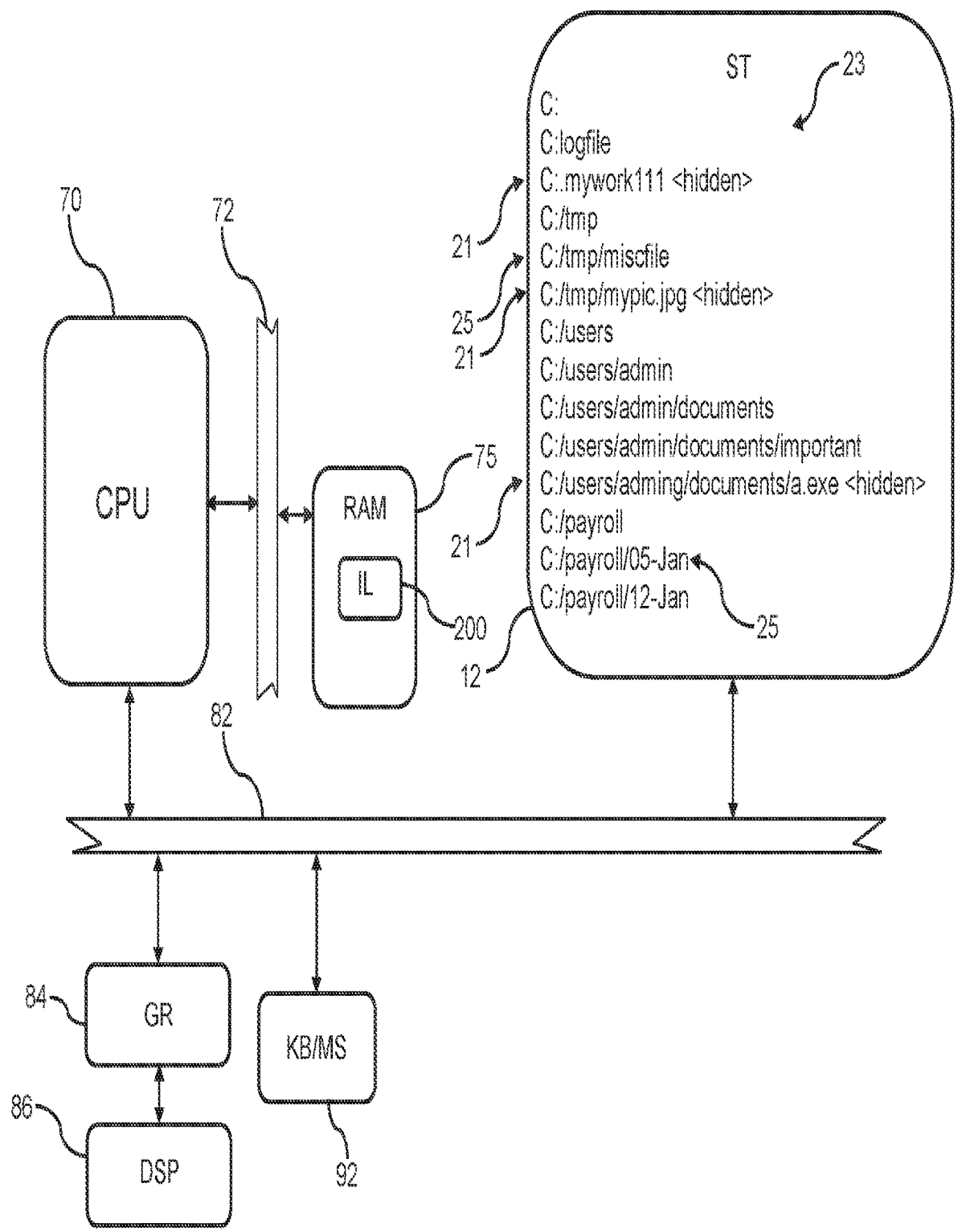
FIG. 7 illustrates the exemplary computer, showing modifications to the file system added by the system for detecting and preventing ransomware.

Referring to FIG. 7, a simplified example of a protected computer 10 and storage 12 after installation and initialization of the system for detecting and preventing ransomware. In this example, the system for detecting and preventing ransomware has installed three watch files 21. The watch files are typically of a small size (e.g., less than 70 KB) and, although only three watch files 21 are shown for brevity and clarity reasons, many watch files 21 are deployed in random locations of the filesystem 23 in the storage 12, for example, 25 watch files 21 are deployed. Note that there is no limitation to the number and/or size of watch files 21. Further, in some embodiments, the location, type, and file name of the watch files 21 is generated during initialization so as to prevent ransomware from knowing which files are watch files 21. Further, in some embodiments, the watch files 21 are periodically relocated and/or renamed to prevent ransomware from predicting which files in the filesystem 23 are watch files 21.

As the watch files 21 are not native to the filesystem 23, there is no reason for any program (other than a backup program) to access the watch files 21. Further, there is definitely no reason for any program to write or overwrite any of the watch files 21.

The watch files 21 and a certain number of native files 25 are cataloged in what is known as an ingest log 200, the details of which is shown in FIG. 7. Note that any structure and file-type is anticipated for the ingest log 200 including a flat file, a database, a hash table, etc. Periodically, each watch file 21 and native file 25 in the ingest log 200 are tested to determine if they were accessed or overwritten. When the ransomware program 14 initiates, it will proceed to encrypt files in the filesystem 23, eventually encrypting one or more of the files referred to by the ingest log 200, thereby signaling the system for detecting and preventing ransomware that ransomware is running.

Referring to FIG. 8, a sample ingest log 200 is shown. The ingest log 200 contains file locations of watch files 21, for example, as shown in entry 202; and file locations of native files 25 that are being monitored, for example, as shown in entry 204. Note that any file structure of the ingest log 200 is anticipated, including a flat file, database, etc. Note that the ingest log 200 is created during initialization of the system for detecting and preventing ransomware and updated as files are changed by the user. For example, the date/time accessed 206 is updated when a user accesses one of the native files 25 that are referenced by the ingest log 200.

Note that it is fully anticipated that a user of the protected computer 10 will access/modify any one of the native files 25 and such may or may not result in a notification of potential ransomware depending upon the number, type, and frequency of such access.

Note that although timestamps are shown in FIG. 8, in some embodiments, the ingest log 200 includes a hash value and/or at least partial content of the watch files 21 and/or native files 25 and periodically, the current hash value or current content of such watch files 21 and/or native files 25 are compared that stored in the ingest file 200 to determine if the watch files 21 and/or native files 25 have been modified.

Figure 9:
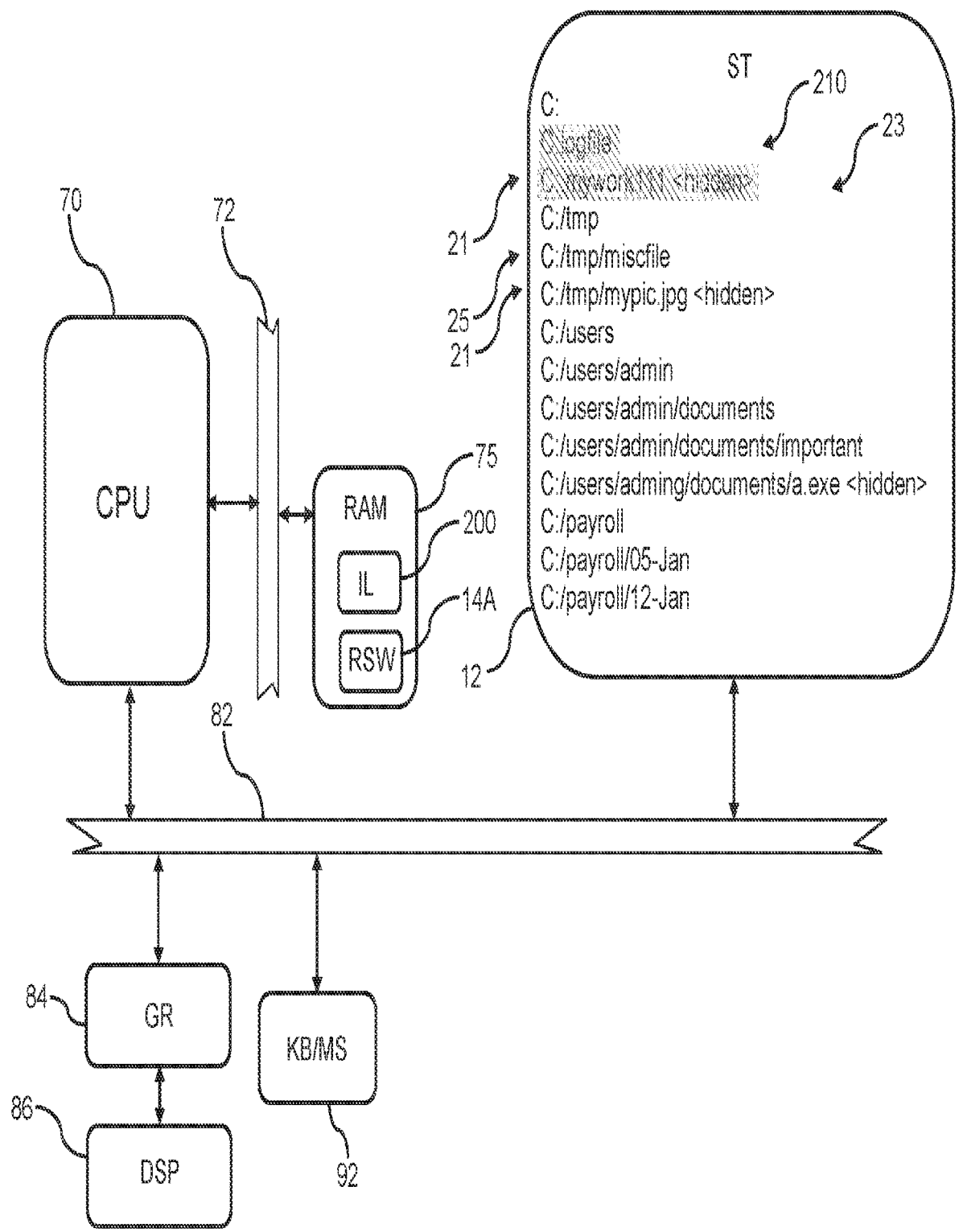
FIG. 9 illustrates the exemplary computer, showing alterations to the file system by ransomware as detected by the system for detecting and preventing ransomware.

Referring to FIG. 9, the protected computer 10 now has a running ransomware program 14A in RAM 75. Although it is anticipated that the running ransomware program 14A will encrypt files in the filesystem 23 in any order, for simplicity, this running ransomware program 14A starts working from the top of the filesystem 23 and has encrypted two files 210. As the second encrypted file is a watch file 21, there is no reason for any program to access or modify a watch file 21 and hence, when the system for detecting and preventing ransomware performs a periodic check, the date/time accessed 206 of this watch file 21 from the ingest log 200 will not match the date/time accessed in the filesystem, allowing for detection of the ransomware.

If, instead, the running ransomware program 14A did not operate sequentially and randomly encrypted files in the filesystem 23, eventually, either a watch file 21 would be modified or several native files 25 that are being watched by the ingest log 200 will be modified. When the system for detecting and preventing ransomware performs a periodic check, the number of modified native files 25 will be modeled to determine if ransomware is detected. For example, if one native file 25 is modified, it is likely that the user of the protected computer 10 performed an operation on that file, but if ten or fifteen native files 25 are modified within a specific time frame, then it is likely that ransomware has made those modifications.

Note that the system for detecting and preventing ransomware stops operation of a suspected program as soon as either type of detection is made. In some embodiments, the suspected program is temporarily stopped or suspended and a warning message 102 as in FIG. 4 is displayed. It is known that many legitimate programs will access large numbers of files at certain times. For example, backup programs often access several files to copy the files to backup storage. Sometimes the backup programs run at night to not impact the performance of the protected computer 10. As many native files 25 and many watch files 21 will be accessed by the backup program, such programs are likely to be flagged as ransomware by the system for detecting and preventing ransomware.

Another program that accessed several files at certain times is a virus protection program in which some or all files are periodically scanned for viruses. As many native files 25 and many watch files 21 will be scanned by the virus protection program, such programs are likely to be flagged as ransomware by the system for detecting and preventing ransomware.

As discussed, it is important to detect the operation of ransomware, but it is also important not to over-report legitimate programs that are performing their intended tasks as the later will result in frustrating the user; potentially to a point where the user stops using the system for detecting and preventing ransomware. To reduce over-reporting of legitimate programs, the system for detecting and preventing ransomware uses one or more mechanisms to model which programs, scenarios of operation, and/or timing of operations are legitimate. For example, one mechanism is a simple whitelist 15 of programs that are known to be legitimate. In such, if a virus program named "antivirus.exe" is added to the whitelist 15, then upon detection of suspected ransomware and determining that "antivirus.exe" is the cause of the detection, no action to stop "antivirus.exe" is taken. It is anticipated that the whitelist 15 contain more than just the filename of the trusted programs (e.g., file sizes, file hash values, program registration information) such that it can be determined if the program was modified or overwritten with ransomware.

Another method of not to over-report legitimate programs by the system for detecting and preventing ransomware is to model the behavior of programs in the system and learn from such modeling. For example, as discussed, a single access of a native file 25 that is recorded in the ingest log 200 is likely not cause for declaring that ransomware is running, as it is anticipated that a user of the protected computer 10 will periodically access a few native files 25, but what if three native files 25 are accessed within five seconds? Is that normal operation in the protected computer 10? What if it were ten files in 30 seconds? What if the file access occurred at 10 AM? What if the file access occurred at 11:00 PM on a Saturday? All of these questions depend upon what is normal use of the protected computer 10 and, therefore, in some embodiments, the system for detecting and preventing ransomware uses artificial intelligence to model the activities of the protected computer 10 to determine which native files 25 are likely accessed, when the native files 25 are likely accessed, sequences and timing of accesses, etc. For example, in the morning between 8 AM and 9 AM, a user starts a database program to make updates and the database program accesses three native files 25 that are cataloged in the ingest log 200, all accesses within five seconds of each other. At first, the learning (AI) portion of the system for detecting and preventing ransomware has no knowledge of this activity and a warning message 102 is displayed. After the user/operator indicates "allow" 107, the learning (AI) portion remembers the time, sequence, and operation so that the next day, if a similar operation occurs, the learning (AI) portion of the system for detecting and preventing ransomware assumes the same operation has occurred as the day prior and assumes legitimate operation. Now, if on a different day at 8:30 AM, the same three files are accessed but the sequence of access is different or the delay between accesses is greater than five seconds, the learning (AI) portion of the system for detecting and preventing ransomware realizes that the operation is different and suspends the offending program, displaying a warning message 102.

This learning process of the system for detecting and preventing ransomware eventually tunes the system for detecting and preventing ransomware to be aware of how the user operates the protected computer 10 and what is normal, adjusting whenever potential ransomware is detected and the user indicates that the operation is legitimate. In such, even if a program listed in the whitelist 15 performs a different sequence of operations or at a different time, the system for detecting and preventing ransomware will detect the potential for ransomware, suspend the program and display a warning message 102 until informed by the user/operator that this is a legitimate operation of the protected computer.

Figure 10:
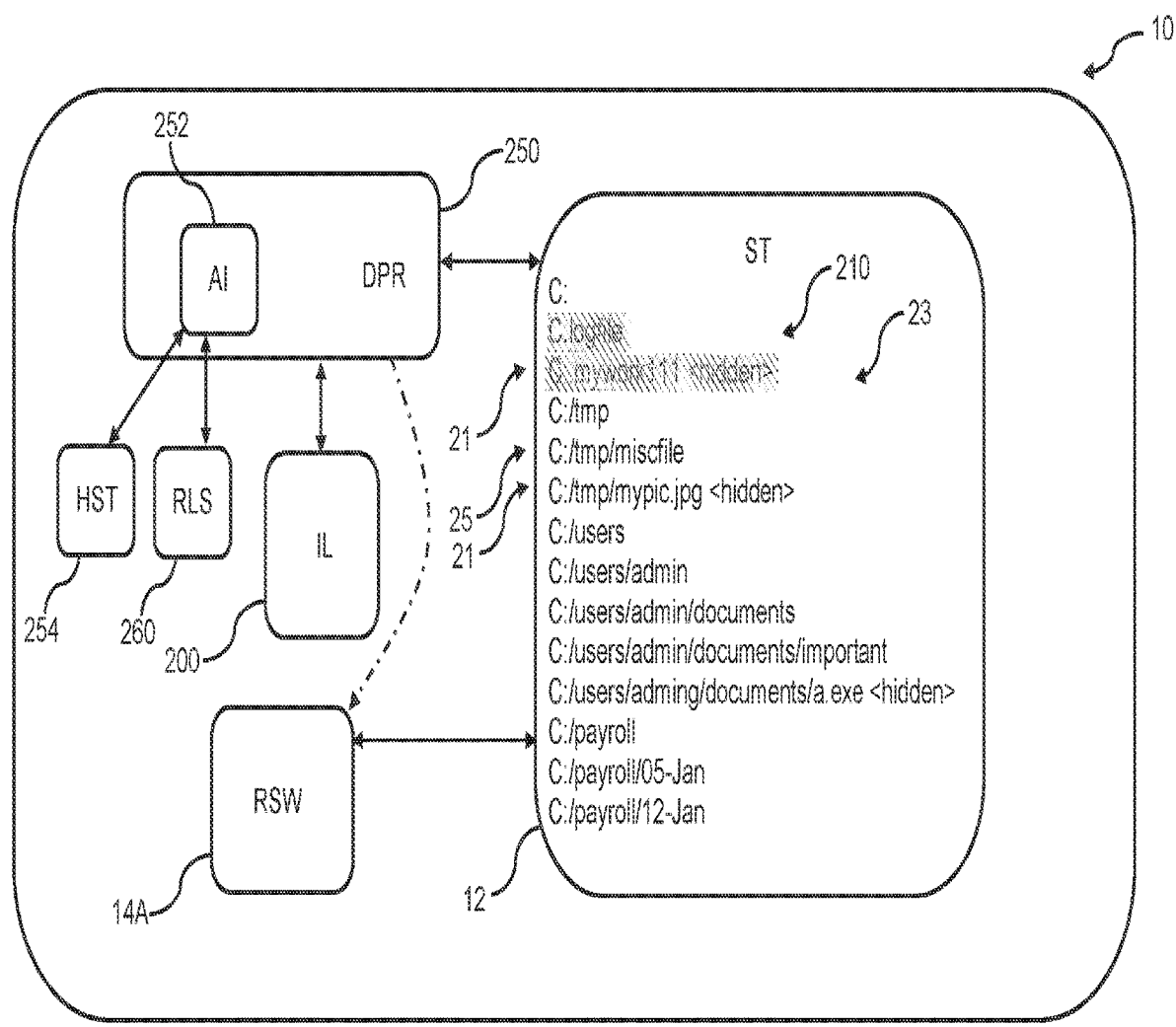
FIG. 10 illustrates the system for detecting and preventing ransomware utilizing history and artificial intelligence to detect and prevent ransomware.

Referring to FIG. 10, an embodiment of the system for detecting and preventing ransomware 250 is shown. In this example, there is a running ransomware program 14A that has already encrypted two files 210 in the filesystem 23. The system for detecting and preventing ransomware 250 is monitoring the filesystem 23 looking for any access of files in the ingest log 200. When the system for detecting and preventing ransomware 250 detects such access of one or more files identified by the ingest log 200, the artificial intelligence engine 252 of the system for detecting and preventing ransomware 250 determines the level of threat based upon historical data 254 and, in some embodiments, upon rule settings 260. Rule settings 260 include such things as user settings (e.g., a user can set the minimum number of native files 25 that must be accessed in a specific timeframe before ransomware is declared) and default settings.

After the system for detecting and preventing ransomware 250 determines there is a threat, the system for detecting and preventing ransomware 250 uses operating system directives to stop or suspend the running ransomware program 14A. In some embodiments, the system for detecting and preventing ransomware 250 then notifies the user, for example, by emitting a warning message 102 or any other type of notification including, but not limited to, email messages, text messages, audio output, etc. Upon the user allowing the running ransomware program 14A to proceed (e.g., declaring that the program is not ransomware), the historical data 254 and/or rule settings 260 to help the artificial intelligence engine 252 of the system for detecting and preventing ransomware 250 reduce reporting of false negatives.

In some embodiments, after a response to the warning message 102 confirms that the running ransomware program 14A is not approved by the user/operator, a copy of the ransomware program 14 is forwarded to the server 500 for further analysis and cataloging as ransomware.

Note that due to latency and timing, it is conceived that some damage to the files 210 in the filesystem 23 are inevitable, but the ransomware will likely be caught before many files are damaged and, for most well managed systems, a backup of critical files is available to replace those few files 210 that have been encrypted by the running ransomware program 14A as it is unlikely that the files 210 and copies of the files stored in a backup area are both encrypted before the running ransomware program 14A is detected.

Note that many computers have access to multiple filesystems 23 and that ransomware will try to access every filesystem 23 accessible by the protected computer 10. Therefore, the watch files 21 will be installed in various such filesystems 23 whether the filesystems 23 are local, permanent, removable, remote, cloud-based, etc.

Figure 11:
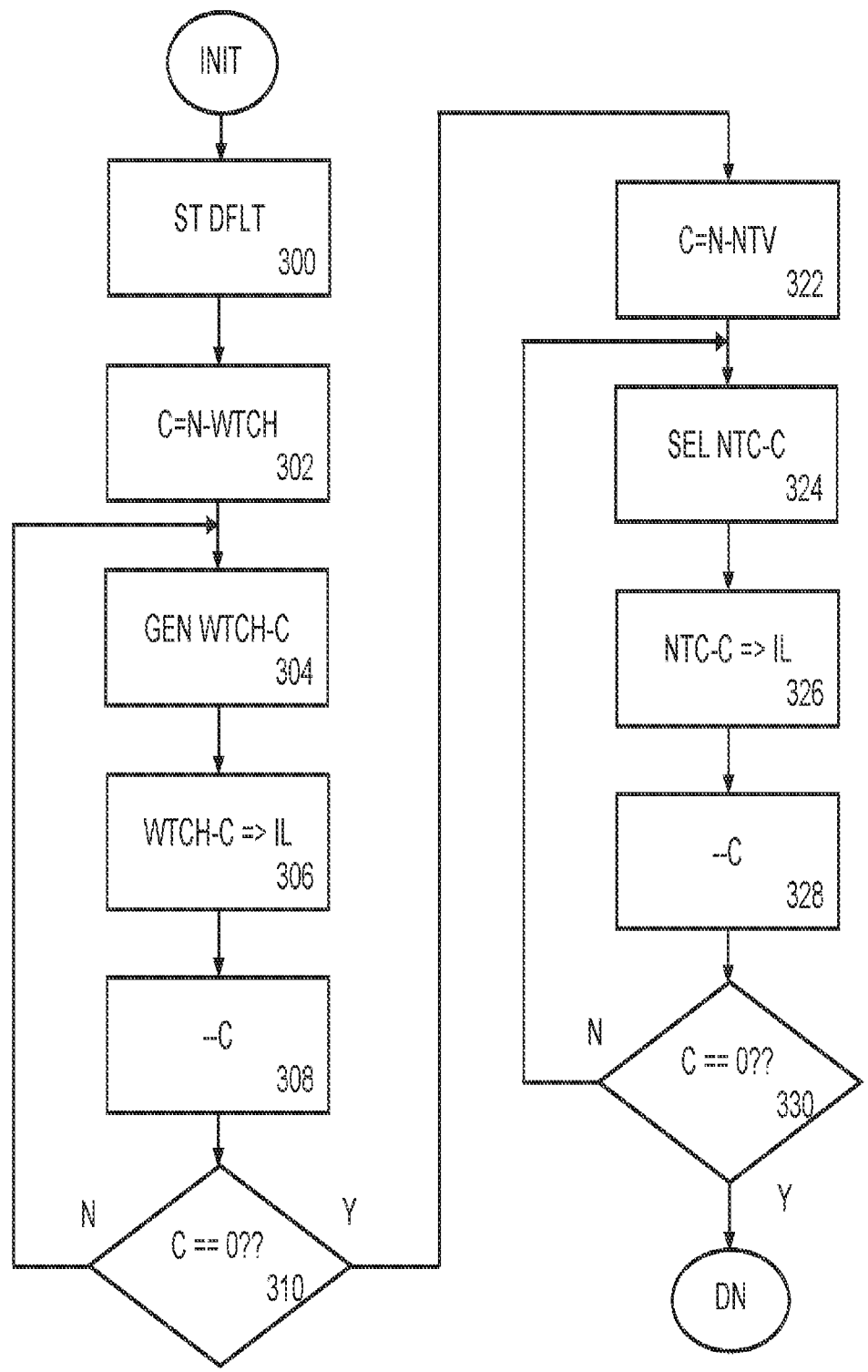
FIGS. 11-13 illustrate exemplary program flows of the system for detecting and preventing ransomware.
Figure 12:
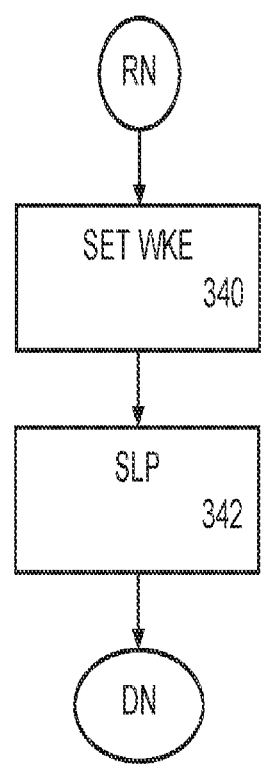
Figure 13:
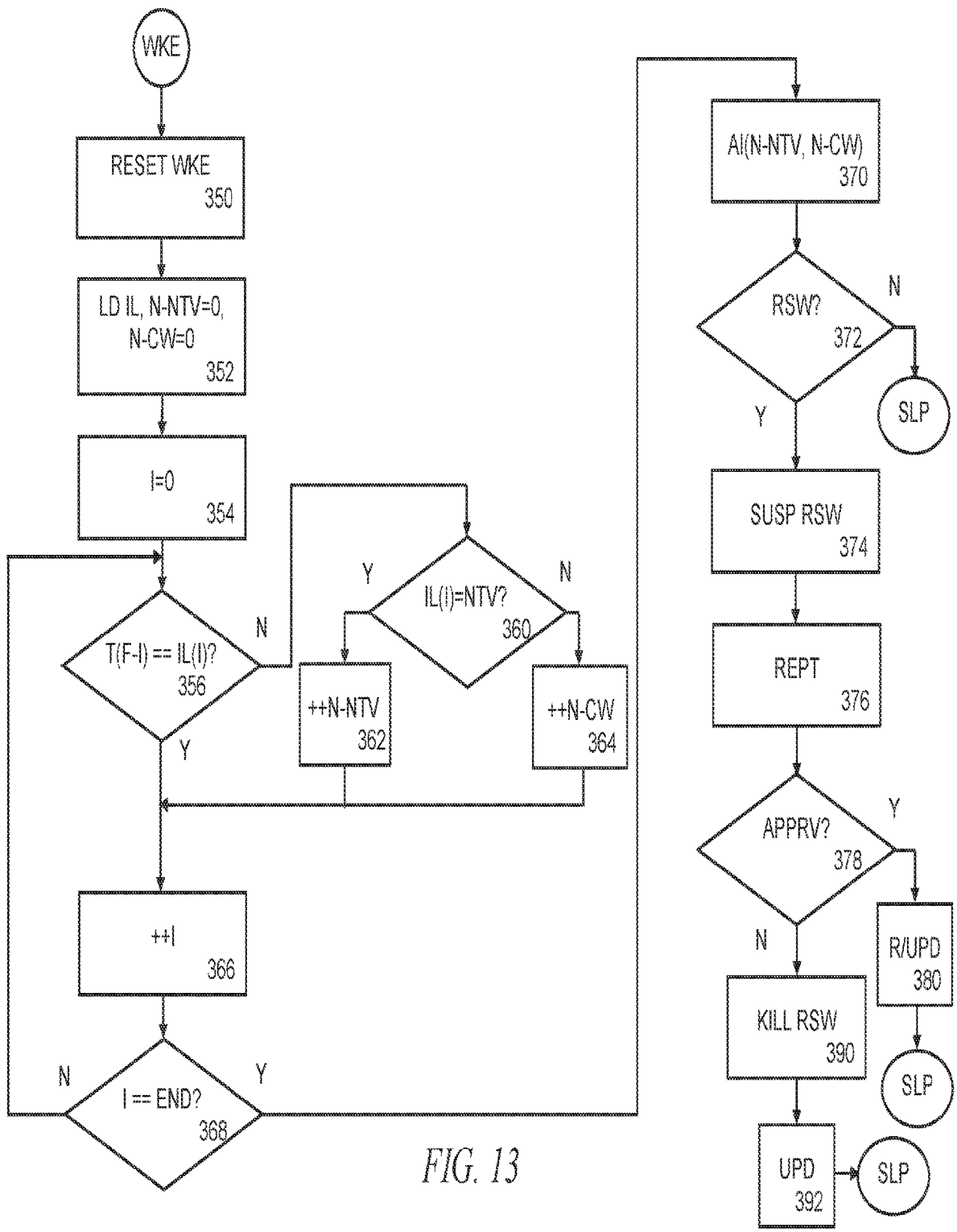

Referring to FIGS. 11-13, exemplary program flows of the system for detecting and preventing ransomware are shown. Note that the program flows shown in FIGS. 11-13 are examples of one implementation, as many other implementations are anticipated. For example, these examples use wake-up timers and at certain intervals, the system for detecting and preventing ransomware wakes up and performs checks of the watched files. Another implementation might hook into the operating system and run such checks every time a file is opened or every $n^{th}$ time a file is opened.

In FIG. 11, an example program flow of the initialization portion of the system for detecting and preventing ransomware is shown. The first step in initialization is to set defaults 300 to various parameters and the AI engine, for example, setting the number of watch files 21 to a default value such as 25 files, setting the number of native files 25 to a value such as 25 files, and setting the default granularity of what occurrences constitute detection of a running ransomware program 14A.

Next, a first loop 302-310 generates the watch files 21. The loop includes setting 302 a counter, C, to the number of watch files 21 that will be created (e.g., setting C=25). Then, in a loop, generating 304 a watch file 21 and adding 306 the watch file 21 to the ingest log 200. In a preferred embodiment, the watch file 21 is generated as a file of random size comprising random data and having one of a set of known file types. For some operating systems, the file types are defined as a suffix appearing after a period in the file name (e.g., an executable ".exe", an image file ".jpg", a document file ".doc", a movie file "mov", a music file ".mp3"). The location in the filesystem 23 at which the watch file is stored is determined algorithmically so as to randomly place the watch files 21 throughout the filesystem 23 at various unpredictable locations in the filesystem 23, typically a few watch files 21 are stored in the root folder of the filesystem 23 and the remainder spread out in sub folders that are one or two levels down from the root folder.

After each watch file 21 is generated 304 and added 306 to the ingest log 200, the counter, C, is decremented 308 and the loop continues until the counter reaches zero 310.

Next, the native files 25 are selected. Note that the native files 25 are existing files that are present in the filesystem 23 at the time of initialization. The native files 25 are any existing file such as operating system files, data files, program files, temporary files, database files, font files, document files, image/video files, music files, etc. It is fully anticipated that some or all of the native files 25 will be accessed, moved, deleted, written by programs executed by a user of the protected computer 10. Being such, as discussed, the system for detecting and preventing ransomware will falsely report some valid operations as ransomware, more so before learning how the files are accessed during normal operation of the protected computer 10. As it is anticipated that any one of the native files 25 is subject to deletion, upon detection of a deleted native file 25, the system for detecting and preventing ransomware will randomly select another native file 25 to take place for the native file 25 that was deleted.

It is anticipated that all or portions of the exemplary program flow of the system for detecting and preventing ransomware 250 execute on the protected computer 10 while portions of the exemplary program flow of the system for detecting and preventing ransomware 250 execute on the server 500.

Next, a second loop 322-330 catalogs the native files 25. The loop includes setting 322 a counter, C, to the number of native files 25 that will be cataloged (e.g., setting C=25). Then, in a loop, selecting 324 a native file 25 and adding 326 the native file 25 to the ingest log 200. In a preferred embodiment, the native files 25 are randomly selected from random locations in the filesystem 23. The type of native file 25 selected and the random location of the native file 25 within the filesystem 23 is determined algorithmically so as to randomly select the native file 25 throughout the filesystem 23 at various unpredictable locations in the filesystem 23, typically a few native files 25 are selected from the root folder of the filesystem 23 and the remainder selected from sub folders that are one or two levels down from the root folder. In some embodiments, the types of native file 25 are selected to represent a variety of file types (e.g., document files, executable files, image/video files, music files, text files, log files . . . ).

After each native file 25 is selected 324 and cataloged 326 in the ingest log 200, the counter, C, is decremented 328 and the loop continues until the counter reaches zero 330.

After initialization completes, the system for detecting and preventing ransomware 250 schedules the detection step based upon resources available in the operating system of the protected computer 10. It is anticipated that the detection step run periodically, the period of which is determined based upon performance constraints as the protected computer 10 must also function well for the intended purposes. In FIG. 12, one such implementation of this scheduling is shown. In such, the system for detecting and preventing ransomware 250 sets a wake-up event 340, then goes to sleep 342. There are many ways anticipated to periodically initiate the detection step depending upon operating system features, all of which are fully anticipated and included here within. Further, the frequency that the detection step is run is anticipated to be a fixed interval (e.g., once every second) or a variable interval that is set depending upon the workload of the protected computer 10.

The detection step is shown in FIG. 13 and runs when the system for detecting and preventing ransomware 250 wakes. The detection step resets 350 the wake event so that another wake event will occur later. The reset 350 is anticipated to be performed at any time during the detection step.

The detection step loads/accesses the ingest log 200, resets the number of changed native files 25 detected (C-NTV) to zero, and resets the number of watch files 21 detected as changed (N-CW) to zero.

Next, a loop 354-368 starts with setting 354 an index to zero (zero represents the first entry in the ingest log 200). Next, a check 356 is performed to determine if the timestamp of the file pointed to by the current entry in the ingest log 200 (e.g., T(F-I)) matches the previously recorded timestamp that is stored in the ingest log 200 for that file. For example, using the sample ingest log 200 of FIG. 8, if I==0, then the indexed file is be "C:mywork111" and the timestamp recorded in the ingest log 200 is 9/4/2020 01:00:30. The timestamp of the actual file "C:mywork111" is compared to 9/4/2020 01:00:30 to determine if that file was accessed/modified. Note that in some operating systems, there are multiple timestamps, for example, a timestamp for reading and a different timestamp for writing. It is fully anticipated that the system for detecting and preventing ransomware 250 compare one, any, or all timestamps to one or more timestamps stored in the ingest log 200. Once the check 356 determines that the file pointed to by the current entry in the ingest log 200 has changed, it is determined 360 if the corresponding entry in the ingest log 200 (IL(I)) is a native file. If the file pointed to by the current entry in the ingest log 200 is a native file 25, the number of changed native files 25 detected (C-NTV) is incremented 362. Otherwise, the number of watch files 21 detected as changed (N-CW) is incremented 364.

This loop continues with incrementing 366 the index I, thereby pointing to the next entry in the ingest log 200. Next, if the index I is not at the end of the ingest log 200, the above loop continues. Otherwise, the number of files that have changes is analyzed in steps 370-392.

Although there are many forms of analysis anticipated, for example, a simple test such as if the number of changed native files 25 detected (C-NTV) is greater than three or the number of changed watch files 21 detected (N-CW) is greater than one, or a more complicated test that requires any of various combinations of changes (e.g., three native/two watch or five native/one watch or zero native/five watch). Further, even more complicated forms of analysis are anticipated taking into account the time interval since the last analysis and the number of changes detected previously.

One anticipated analysis utilizes a learning system that employs artificial intelligence 370 to analyze the number of changed native files 25 detected (C-NTV) and the number of changed watch files 21 detected (N-CW). In this, the artificial intelligence engine 252 (see FIG. 10) utilizes historical data 254 (e.g., data from prior analysis and feedback as per responses to allow/block the findings of that analysis) and rule settings 260 (e.g., declare ransomware if more than two watch files 21 have changed).

If the artificial intelligence 370 indicates 372 no potential for ransomware, the system for detecting and preventing ransomware 250 sleeps. Otherwise, the system for detecting and preventing ransomware 250 suspends 374 the running ransomware program 14A and reports 376 the running ransomware program 14A as previously described. If the user/operator of the protected computer 10 approves 378, the running ransomware program 14A which is believed not to be ransomware by the user/operator is resumed and the historical data 254 and rule settings data 260 are updated 380 to reflect this added knowledge. On the other hand, if the user/operator of the protected computer 10 does not approve 378, the running ransomware program 14A which is believed to be ransomware by the user/operator is killed 390 and the historical data 254 and rule settings data 260 are updated 392 to reflect this added knowledge.

Note that, in some embodiments, the system for detecting and preventing ransomware 250 performs additional steps, especially when the user/operator does not approve and, therefore, it is believed that the running ransomware program 14A is indeed ransomware. In some such embodiments, this includes quarantining the ransomware program 14, adding the ransomware program 14 to a blacklist, transferring the ransomware program 14 to the server 500 for further analysis and for informing other protected computers 10 of the ransomware program 14 (e.g., adding the ransomware program 14 to blacklists on all computers that run the system for detecting and preventing ransomware 250), and reporting the ransomware program 14 to authorities. In addition, it is anticipated that in some embodiments, other data is captured from the protected computer 10 that is useful in determining the origin of the ransomware program 14 such as browser history, file access history, program installation history, etc.

Equivalent elements can be substituted for the ones set forth above such that they perform in substantially the same manner, in substantially the same way, for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for detecting and preventing ransomware, the system comprising:
    a computer protected by the system for detecting and preventing ransomware, the computer having a processor and a storage, the storage having a filesystem there within;
    software in operation on the computer creates at least one of a first number of watch files or a second number of native files in the filesystem, for each watch file, an entry is added to an ingest log in a way that indicates at least a location of and a timestamp of the each watch file, for each native file, the entry is added to the ingest log in a way that indicates at least the location of the each native file and the timestamp of the each native file;
    periodically, the software in operation on the computer compares each timestamp of each entry in the ingest log to a current timestamp in the filesystem of at least one of the each watch file or the each native file, wherein the software in operation on the computer determines at least one of a first count of watch files that have changed or a second count of native files that have changed, wherein the software in operation on the computer determines if the first count of watch files that have changed or the second count of native files that have changed indicate that a program that is in operation on the computer contains ransomware, wherein the software in operation on the computer suspends the program and reports the program; and
    when the software in operation on the computer receives a command that indicates that the program does not contain the ransomware, the software in operation on the computer resumes execution of the program.

2. The system of claim 1, wherein when the software in operation on the computer creates the first number of watch files in the filesystem, each watch file is of a random size and each watch file is of a type randomly selected from a predetermined list of types.

3. The system of claim 2, wherein the predetermined list of types comprises an executable, a document file, an image file, a movie file, a text file, a log file, and a music file.

4. The system of claim 2, wherein when the software in operation on the computer creates the first number of watch files in the filesystem, the software randomly installs each of the watch files in folders of the filesystem.

5. The system of claim 1, wherein when the software in operation on the computer catalogs the second number of native files from the filesystem, each of the native files are randomly selected from the filesystem.

6. The system of claim 1, wherein the first number of watch files is 25 and the second number of native files is 25.

7. The system of claim 1, wherein the software in operation on the computer determines if the first count of watch files that have changed and the second count of native files that have changed indicate that the program contains the ransomware using a learning system that analyzes historical changes and rules, wherein the software in operation on the computer tunes to compensate for normal use of the computer.

8. A method for detecting and preventing ransomware in a computer, the method comprising:
    performing an action that at least one of creates a first number of watch files in a filesystem of the computer or catalogs a second number of native files from the filesystem of the computer;
    adding an entry to an ingest log that indicates at least a location of-and a timestamp of the each watch file or the each native file;
    periodically, comparing each timestamp of each entry in the ingest log to a current timestamp in the filesystem of at least one of the each watch file or the each native file to determine a first count of watch files that have changed or a second count of native files that have changed;
    determining if at least one of the first count of watch files that have changed or the second count of native files that have changed indicates that a program contains ransomware, wherein a determination indicates that the ransomware is in operation on the computer;
    suspending the program when the determination is made;
    reporting the program when the determination is made; and
    resuming execution of the program when a command is received that indicates that the program does not contain the ransomware.

9. The method of claim 8, wherein when creating the first number of watch files in the filesystem, creating each watch file is of a random size and of a type randomly selected from a predetermined list of types.

10. The method of claim 9, wherein when creating the first number of watch files in the filesystem, randomly installing each of the watch files in folders of the filesystem.

11. The method of claim 8, wherein when cataloging the second number of native files from the filesystem, each of the native files are randomly selected from the filesystem.

12. The method of claim 8, wherein when determining if the first count of watch files that have changed and the second count of native files that have changed indicates that the ransomware is in operation on the computer, using a learning system that analyzes historical changes and rules, wherein the software in operation on the computer tunes to compensate for normal use of the computer.

13. Program instructions tangibly embodied in a non-transitory storage medium of a computer for protecting from ransomware, wherein the at least one instruction comprises:
    computer readable instructions running on the computer performing an action that at least one of creates a first number of watch files in a filesystem of the computer or catalogs a second number of native files from the filesystem of the computer, wherein an entry is added for each watch file to an ingest log that indicates at least a location of and a timestamp of the each watch file, wherein the entry is added for each native file to the ingest log that indicates at least the location of and the timestamp of the each native file;

periodically, the computer readable instructions running on the computer comparing each timestamp of each entry in the ingest log to a current timestamp in the filesystem of at least one of the each watch file or the each native file;

the computer readable instructions running on the computer determining at least one of a first count of watch files that have changed or a second count of native files that have changed;

the computer readable instructions running on the computer determining if at least one of the first count of watch files that have changed or the second count of native files that have changed indicates that a program containing ransomware is in operation on the computer;

the computer readable instructions running on the computer learning from historical changes and rules;

the computer readable instructions running on the computer tuning to compensate for normal use of the computer;

the computer readable instructions running on the computer making a determination that the ransomware is in operation on the computer after accounting for the normal use;

the computer readable instructions running on the computer suspending the program when the determination is made;

the computer readable instructions running on the computer reporting the program when the determination is made; and the computer readable instructions running on the computer resuming execution of the program when a command is received that indicates that the program does not contain ransomware.

14. The program instructions tangibly embodied in the non-transitory storage medium of claim 13, wherein when creating the first number of watch files in the filesystem by the computer readable instructions running on the computer, the computer readable instructions running on the computer creating each watch file is of a random size and of a type randomly selected from a predetermined list of types.

15. The program instructions tangibly embodied in the non-transitory storage medium of claim 14, wherein when creating the first number of watch files in the filesystem by the computer readable instructions running on the computer, the computer readable instructions running on the computer randomly installing each of the watch files in folders of the filesystem.

16. The program instructions tangibly embodied in the non-transitory storage medium of claim 13, wherein when cataloging the second number of native files from the filesystem by the computer readable instructions running on the computer, each of the native files are randomly selected from the filesystem by the computer readable instructions running on the computer.

* * * * *